United States Patent

Akahoshi et al.

[11] Patent Number: 6,025,008
[45] Date of Patent: Feb. 15, 2000

[54] YOGURT

[75] Inventors: Ryoichi Akahoshi; Takahiro Mizobuchi; Yoshihiro Takahashi; Taketsugu Saita, all of Tokyo, Japan

[73] Assignee: Kabushiki Kaisha Yakult Honsha, Tokyo, Japan

[21] Appl. No.: 08/894,222

[22] Filed: Aug. 18, 1997

[30] Foreign Application Priority Data

Feb. 17, 1995 [JP] Japan .................................. 7-52067

[51] Int. Cl.[7] .................................................. A23C 17/00
[52] U.S. Cl. ............................ 426/583; 426/34; 426/580; 426/585
[58] Field of Search .................................. 426/580, 583, 426/34, 42, 43, 585

[56] References Cited

U.S. PATENT DOCUMENTS 4,913,921   4/1990   Schroeder et al. ...................... 426/321

OTHER PUBLICATIONS

89–159705 WPIDS, Abstracting GB 2209936 A, Sep. 1993.

Tamime et al., Yoghurt Science and Technology, 1985, pp. 32, 33, 34, 71–82, and 261, Pergamon Press, Oxford.

*Primary Examiner*—Leslie Wong
*Attorney, Agent, or Firm*—Oblon, Spivak, McClelland, Maier & Neustadt, P.C.

[57] ABSTRACT

Yogurt containing lactic acid bacteria and Bifidobacteria, to which one or more kinds of sweet substances selected from a group consisting of palatinose, palatinite, maltose, maltitol, starch syrup, reducing starch syrup and trehalose as well as a refined fish oil containing highly unsaturated fatty acids such as DHA and EPA are added, is packed in an oxygen blocking hermetic package. The yogurt contains highly unsaturated fatty acids and has good flavor and taste, as well as excellent product quality stability, and does not generate a fishy odor during normal storage periods.

8 Claims, No Drawings

YOGURT

This is a National Stage Filing of PCT/JP96/00330, filed Feb. 15, 1996.

TECHNICAL FIELD

The present invention relates to yogurt to which highly unsaturated fatty acids such as DHA and EPA are added. More specifically, the present invention relates to yogurt having no fishy odor in which palatinose, palatinite, maltose, maltitol, starch syrup, reducing starch syrup, or trehalose and the like selected as a sweetener for the yogurt are used in admixture with the highly unsaturated fatty acids.

BACKGROUND ART

One of the features of the fats and oils from fish and aquatic mammals is their high content of long chain highly unsaturated fatty acids such as DHA (docosahexaenoic acid) or EPA (eicosapentaenoic acid) which are not contained in the fats of terrestrial animals or in vegetable oils. Recently, these highly unsaturated fatty acids have been recognized to be highly effective in the prevention or treatment of cardiovascular diseases such as myocardial infarctions and cerebral thrombosis. In addition, it has been reported that these highly unsaturated fatty acids have antineoplastic activity, and are effective in preventing memory and learning disorders, improving visual functions, preventing allergies, treating diabetes, and in rejuvenating skin.

Therefore, fish are being given a second look as health food. Fish oils which are rich in highly unsaturated fatty acids are refined so as to deodorize, decolorize, and further raise the content of highly unsaturated fatty acids. This refined fish oil is being supplied in pure form, or in an admixture with other food stuffs, as a medicinal drug or a dietary supplement.

The most important problem arising from the addition of refined fish oil to everyday foods so that the highly unsaturated fatty acids help maintain health, is the fishy odor. That means fish oil, even a highly refined one, is oxidized while it is stored so as to emit a strong peculiar odor. Accordingly, even though fish oil does not smell at the stage when it is added to foods, it often becomes odorous during storage, and exhibits an extremely deteriorated flavor and taste.

Various attempts have been made in the past to eliminate such a fishy odor. For example, Japanese Patent Publication No. 3-72264 discloses that an emulsified fish oil is fermented, then added to foods, and Japanese Patent Laid-open No. 6-90662 discloses a process in which a fish oil containing DHA or EPA is blended with stock milk or a mix for producing a cultured dairy product to be fermented by lactic acid bacteria or enzyme, or by a process in which fish oil is blended with dairy products which have been fermented by lactic acid bacteria. But in reality, it has been difficult to control the fishy odor completely or prevent the further generation of the fishy odor by only fermenting the emulsified fish oil, or by simply blending the fish oil with dairy products, since the fish oil components change with time.

Although it may be meaningful to add a refined fish oil to yogurt, which is commonly consumed food, since the addition will improve the shelf-life of the yogurt while facilitating the continuous ingestion of highly unsaturated fatty acids, even when refined fish oil is added to yogurt with such goals in mind, the occurrence of fishy odor is unpreventable if the yogurt is stored for a long time. Moreover, the flavor and taste of the yogurt which are originally plain and simple, are considerably spoiled.

Therefore, an object of the present invention is to examine yogurt containing highly unsaturated fatty acids which are very significant from the view point of nutrition science, and yet have not yet been widely used due to the deterioration of flavor and taste by the development of the fishy odor during storage as described above in order to provide a yogurt containing highly unsaturated fatty acids while having good flavor and taste, and excellent stability in product quality (which will not have a fishy odor) during a normal storage period.

DISCLOSURE OF INVENTION

The yogurt containing highly unsaturated fatty acids which is provided according to the present invention is characterized in that it comprises yogurt containing lactic acid bacteria, and Bifidobacteria to which one or more kinds of sweet substances selected from a group consisting of palatinose, palatinite, maltose, maltitol, starch syrup, reducing starch syrup and trehalose as well as a refined fish oil containing highly unsaturated fatty acids are added, and is packed in an oxygen blocking hermetic container.

The above-mentioned specific sweet substance (which may hereinafter simply be referred to as sweet substance) added to the yogurt of the present invention together with the refined fish oil can prevent the development of the fishy odor derived from the refined fish oil, in addition to sweetening the yogurt with the inherent sweetness thereof. Since the fishy odor which occurs while the yogurt containing the refined fish oil, but not containing the sweet substance is stored, becomes undetectable when the sweet substance is added and mixed with the yogurt, it is assumed that the sweet substance does not prevent the generation of the odorous component of the fish oil, but rather has a masking effect so as to mask the fishy odor to such an extent that it can not be detected.

It was found that among many saccharides and sugar alcohols, only a few have the above-mentioned fishy odor masking effect. Also, it was found that among those having the fishy odor masking effect, only the above-mentioned specific sweet substances exhibit the effect in such a concentration range that they do not impart excessive sweetness to the yogurt. For example, sugar—the most commonly used sweetener—shows the fishy odor masking effect only when it is added in the relatively large amount of about 25% by weight or higher, but the addition of sugar in such a large amount makes the yogurt too sweet and is hardly acceptable. Also, monosaccharides such as fructose and glucose do not exhibit a fishy odor masking effect in any concentration.

The fishy odor masking capacity of the sweet substance used according to the present invention is limited as well. If the refined fish oil originally has a strong fishy odor, it is difficult to completely eliminate the fishy odor, even though the sweet substance is added to the limiting concentration. Also, even when a refined fish oil of high quality and a sufficient amount of a sweet substance are added, if the yogurt is placed in an oxidative atmosphere, the oxidation of the fish oil is intensive and the strong fishy odor developed during storage cannot be fully suppressed. Accordingly, it is desirable to use a refined fish oil of as high a quality as possible, which does not have a fishy odor, even when the present invention is carried out. It is also desirable to use an oxygen blocking container for packaging the yogurt, and to leave no oxygen in the package so that an increase of the odorous components due to the oxidation of the fish oil will be prevented.

The form of the yogurt according to the present invention is not limited, and it can be any of liquid yogurt for drinking, solid yogurt and frozen yogurt for eating with spoons, or powdered yogurt produced by freeze-drying cultured milk, and the like.

BEST MODE FOR CARRYING OUT OF INVENTION

The yogurt of the present invention can be produced in principle according to the conventional method of producing yogurt containing Bifidobacteria, and it can be appropriately decided depending on the form of the yogurt and the like, if the lactic acid bacteria and the Bifidobacteria are simultaneously cultured or separately cultured in the fermentation process. A standard process for the production of the yogurt of the present invention will be explained in detail, but it is not to be construed as limiting the production method.

In the case of liquid yogurt, it is advantageous to carry out the cultivation of Bifidobacteria and the cultivation of lactic acid bacteria separately. The stock milk (reconstituted skim milk, whole milk, skim milk and the like) is adjusted to have a non-fat milk solid content of 12–16%, and if necessary, a growth promoting substance such as yeast extract is added, then the stock milk is sterilized by heating, cooled and charged into a fermentation tank. An appropriate amount of a starter is next added and fermentation is started while the temperature is kept between 30–40° C. In the case of Bifidobacteria, it is preferable to maintain anaerobic conditions. After an objective acidity is reached, the fermentation is stopped by cooling and the resulting Bifidobacteria culture and lactic acid bacteria culture are mixed in an arbitrary ratio.

Then a syrup is mixed. A syrup for an ordinary liquid yogurt production contains a sweetener, fruit juice, a flavor, a growth promoting substance for Bifidobacteria and the like. For producing the yogurt of the present invention, the most advantageous fish oil addition method is where the refined fish oil is added to and dispersed in this syrup. Commercially available refined fish oils include those which are emulsified and those that remain in the form of oil. Both of them can be used according to the present invention, but emulsified fish oils are preferable since they can be easily dispersed in the syrup homogeneously, and are less likely generate a fishy odor. It is needless to say that refined fish oils having higher contents of highly unsaturated fatty acids such as DHA and EPA are preferable, and particularly preferable are those having DHA contents (in the case of emulsified product, the content is based on the fish oil contained therein) of about 15% or higher. If the refined fish oils have extremely low DHA contents or the refined fish oils originally have a strong fishy odor, the objective may not be attained in some cases even by the present invention in which the sweet substance is used to control the fishy odor.

It is preferable that the refined fish oil is so blended in the yogurt that the concentration of DHA becomes about 0.005–0.2%.

For producing the yogurt of the present invention, the above-mentioned sweet substance—which works not only as the sweetener, but also as the fishy odor masking agent—is used for the syrup. Two or more kinds of sweet substances can be used together in order to improve the quality of the sweetness. The sweet substance is previously dissolved in the syrup in such an amount that the ratio of the sweet substance added to the produced yogurt becomes about 10–38% by weight. The use of additional sugar in order to improve the quality of the sweetness does not directly hinder the effect of the sweet substance of the present invention, nor promote the development of the fishy odor, but its strong sweetness limits the amount of the sweet substance to be added, thus as little sugar as possible should be used.

The milk culture to which the syrup is added is homogenized and charged into an oxygen blocking container. It is a normal practice to use a container having a high oxygen blocking property for packaging yogurt containing Bifidobacteria, in order to improve the viability of the Bifidobacteria which is an obligatory anaerobe. It is also desirable to use a container having the same or higher level of oxygen blocking property—preferably made of a material having oxygen permeability of 10 $cc/m^2 atm.24$ hr or less—as conventional packaging required for ordinary yogurt containing Bifidobacteria.

Examples of usable containers include glass bottles, metal cans, polyester resin bottles, and hermetic containers made of a plastic film having high oxygen blocking properties (such as ethylene vinyl alcohol copolymer film) or an aluminum foil laminated paper. In the case of a container requiring a cap, it is needless to say that the cap material is also required to have oxygen impermeability.

In addition to employing the oxygen blocking container, it is also desirable that no air containing oxygen is left in the container when the milk culture is charged into the container. One effective means therefor is to carry out "complete filling", that is to fill the container leaving no space in the upper part of the container. If complete filling cannot be carried out, another effective method is one effective in which the air in the upper part of the container is replaced with an inert gas.

As the yogurt containing Bifidobacteria is normally charged into an oxygen blocking container, the inside of the yogurt is a very favorable environment for fish oil which is susceptible to denaturation due to oxidation. Although the smell and taste of refined fish oil are not very good even before oxidation, when the refined fish oil is mixed in the yogurt it is incorporated in the fine curd particles, so the refined fish oil does not smell or taste very much. As described above, the present invention is also significant since it facilitates ingestion of highly unsaturated fatty acids on a daily basis.

In the case of the solid yogurt, a starter of lactic acid bacteria and a starter of Bifidobacteria are inoculated into the stock milk which is immediately charged into an oxygen blocking container and fermented therein; or after it is fermented in a fermenter it is charged into an oxygen blocking container. The sweet substance and the refined fish oil must be added to the stock milk if the fermentation takes place in the container. However, when the container is filled following fermentation in the fermenter, the addition can be carried out immediately before the filling of the container. Apart from this, a procedure analogous to that of liquid yogurt is carried out.

The present invention will be further explained with the following Examples and Experiments. The refined fish oil used in the following Examples is a commercially available emulsified product in which the fish oil content is 20% and the DHA content is about 5%.

EXAMPLE 1

To 250 g of dried whole milk was added water to make a total of 1200 g, the mixture was homogenized at 150 $kg/cm^2$ and sterilized by heating at 125° C. for 3 seconds then cooled to 37° C. Then it was inoculated with 1% of a starter of *Lactobacillus acidophilus* and 1% of a starter of *Bifidobacterium breve* and cultured at 37° C. until the pH became 5.2.

A sweet substance in an amount of 0–37.5% based on the yogurt was added to 800 g of a syrup to be mixed with the above-mentioned culture, and a refined fish oil in an amount of 400 mg in terms of DHA, was also added to and homogeneously dispersed in the syrup.

The above-mentioned culture was mixed with the syrup and a glass container was completely filled with the resulting liquid yogurt and kept at 10° C. for 14 days, then the presence of fishy odor was checked for. The results are shown in Table 1. The evaluation criteria of the organoleptic test are as follows.

X: fishy odor was obviously present.

Δ: fishy odor was slightly present.

◯ : fishy odor was hardly noticed.

◉ : absolutely no fishy odor was present.

Furthermore, when no sweet substance was added, the result of the organoleptic test on the 14th day was "X" based on the above criteria. But, when palatinose, maltose, patatinite, or a mixture of three saccharides, i.e. palatinose, maltitose and starch syrup, were added in an amount of 10% and mixed well with the yogurt which contained no sweet substance and had been stored for 14 days, the results of the similar organoleptic test were "◯" for all of the cases, and it was confirmed that the effect of the sweet substance was to mask the odorous components.

TABLE 1

Effect of addition of sweet substances on development of fishy odor in yogurt containing refined fish oil

| sweet substance | Amount of sweet substance added (% by weight) | | | | | | |
| --- | --- | --- | --- | --- | --- | --- | --- |
| | 5.0 | 7.5 | 10 | 12.5 | 15 | 25 | 37.5 |
| palatinose | x | Δ | ◯ | ◯ | ◯ | ◉ | ◉ |
| palatinite | x | Δ | ◯ | ◯ | ◯ | ◉ | ◉ |
| maltose | x | Δ | ◯ | ◯ | ◯ | ◉ | ◉ |
| maltitol | x | Δ | ◯ | ◯ | ◯ | ◉ | ◉ |
| starch syrup | x | Δ | ◯ | ◯ | ◯ | ◉ | ◉ |
| reducing starch syrup | x | Δ | ◯ | ◯ | ◯ | ◉ | ◉ |
| trehalose | x | Δ | ◯ | ◯ | ◯ | ◉ | ◉ |
| mixture A | x | Δ | ◯ | ◯ | ◯ | ◉ | ◉ |
| mixture B | x | Δ | ◯ | ◯ | ◯ | ◉ | ◉ |
| mixture C | x | Δ | ◯ | ◯ | ◯ | ◉ | ◉ |
| sugar (comparative example) | x | x | Δ | Δ | Δ | — | — |
| fructose (comparative example) | x | x | Δ | Δ | Δ | — | — |
| glucose (comparative example) | x | x | Δ | Δ | Δ | — | — |

(Note)
mixture A: palatinose + maltose (1/1)
mixture B: palatinose + maltitol + starch syrup (1/1/1)
mixture C: palatinite + maltose (1/1)
—: Cannot be added in such a large amount

EXAMPLE 2

300 g of 25% skim milk powder solution was heated at 100° C. for 10 minutes, sterilized, cooled to 37° C., inoculated with 1% of a starter of *Streptococcus thermophilus*, and then cultured until the pH became 4.5. Separately, 100 g of 15% skim milk powder solution was heated at 130° C. for 3 seconds and sterilized, then inoculated with 1% of a starter of *Bifidobacterium bifidum* and cultured until the pH became 4.5.

Water was added to 150 g of palatinite, 3 g of pectin, and a refined fish oil (150 mg in terms of DHA) to make a total of 600 g, heated at 100° C. for 5 minutes, sterilized, and then cooled to a temperature of not more than 10° C.

300 g of the above-mentioned lactic bacteria culture solution, 100 g of Bifidobacteria culture solution and 600 g of the palatinose/refined fish oil mixed solution were mixed and homogenized at 150 kg/cm², then a glass container was filled with the mixture and hermetically sealed with a cap made of aluminium foil-laminated paper. The space left in the upper part of the container was replaced with nitrogen gas. The obtained liquid yogurt smelled of no fishy odor at all after being stored at 10° C. for 14 days.

EXAMPLE 3

350 g of 25% skim milk powder solution was heated at 135° C. for 3 seconds, sterilized, cooled to 37° C., inoculated with 0.5% of a starter of *Bifidobacterium bifidum* and 0.5% of a starter of *Lactobacillus acidophilus*, and cultured until the pH became 4.5.

Water was added to 90 g of palatinite, 60 g of maltose, and the refined fish oil (250 mg in terms of DHA) to make a total of 650 g, heated at 110° C. for 3 seconds, sterilized, and then cooled to a temperature of not more than 10° C.

350 g of the above-mentioned culture solution and 650 g of the sweet substance/refined fish oil mixed solution were mixed, and a container made of an aluminium foil-laminated paper was completely filled with the mixture and hermetically sealed. The obtained liquid yogurt smelled of no fishy odor at all after being stored at 10° C. for 14 days.

EXAMPLE 4

Water was added to 120 g of powdered whole milk, 250 g of starch syrup, a refined fish oil (180 mg in terms of DHA) to make a total of 1 kg, the mixture was subjected to homogenization and heat sterilization, then inoculated with 1% of a starter of *Bifidobacterium bifidum* and 0.5% of a starter of *Streptococcus thermophilus*, and cultured at 37° C. until the pH became 4.4.

The solid yogurt comprising the obtained culture was charged into a glass container, and smelled of no fishy odor after being kept at 10° C. for 14 days.

Reference Experiment

The procedure analogous to that of Example 1 was carried out except that palatinose was used as a sweet substance in an amount of 15%, and various containers were filled with the obtained liquid yogurt. A preservative quality test similar to that of Example 1 was then carried out. The same test was carried out on containers containing the same yogurt in which 20% by volume of air was left in the upper part of the container. The results of the organoleptic test carried out on the presence/absence of the fishy odor after storage are as shown in Table 2 and in the cases wherein oxygen permeable containers such as polystyrene resin bottles and containers made of polyethylene film laminated paper were used, a fishy odor that was so strong that it could not be masked with palatinose developed even though the containers were completely filled.

TABLE 2

Effect of different containers on fishy odor generation

| container | space in upper part of container | judgment |
| --- | --- | --- |
| glass bottle | absent | ◯ |
| glass bottle | present | Δ |
| aluminum foil laminated paper container | absent | ◯ |

TABLE 2-continued

Effect of different containers on fishy odor generation

| container | space in upper part of container | judgment |
|---|---|---|
| aluminum foil laminated paper container | present | Δ |
| polyester resin bottle | absent | ○ |
| polyester resin bottle | present | Δ |
| polystyrene resin bottle | absent | x |
| polystyrene resin bottle | present | x |
| polyethylene film laminated paper container | absent | x |
| polyethylene film laminated paper container | present | x |

INDUSTRIAL APPLICABILITY

As described above, according to the present invention which is aimed at producing yogurt containing a refined fish oil which is effective for maintaining good health, yogurt containing Bifidobacteria which contains sufficiently high amount of unsaturated fatty acids such as DHA and EPA can be provided without a fear of deteriorating the flavor or taste of the yogurt by selecting a sweet substance for sweetening, from the specified substances. Thereby, the generation of a fishy odor is controlled by the same substance that is used to sweeten the yogurt.

We claim:

1. Yogurt comprising:
    lactic acid bacteria, including Bifidobacteria, and one or more sweet substances selected from the group consisting of palatinose, palatinite, maltose, maltitol, starch syrup, reducing starch syrup and trehalose in an amount of 10% to 38% by weight; and
    a refined fish oil containing highly unsaturated fatty acids in an amount corresponding to 0.005–0.2% by weight of DHA based on the yogurt; said yogurt packed in an oxygen blocking hermetic package.

2. The yogurt according to claim 1, wherein the oxygen blocking hermetic container is made of a material having an oxygen permeability of not more than 10 cc/m² atm.24 hr.

3. The yogurt according to claim 1, wherein the oxygen blocking hermetic container is completely filled with the yogurt.

4. The yogurt according to claim 1, wherein the oxygen blocking hermetic container is filled with the yogurt and the upper space in the container is replaced with an inert gas.

5. The yogurt according to claim 1, containing 15 to 38% by weight of the sweet substance.

6. The yogurt according to claim 1, containing 20 to 38% by weight of the sweet substance.

7. The yogurt according to claim 1, containing 25 to 38% by weight of the sweet substance.

8. The yogurt according to claim 1, which contains one of the sweet substances.

* * * * *

UNITED STATES PATENT AND TRADEMARK OFFICE
CERTIFICATE OF CORRECTION

PATENT NO. : 6,025,008
DATED : February 15, 2000
INVENTOR(S): Ryoichi AKAHOSHI et al.

It is certified that an error appears in the above-identified patent and that said Letters Patent is hereby corrected as shown below:

On the title page, items [86] and [87] have been omitted. The PCT information should read as follows:

--- [22] PCT filed: February 15, 1996

[86] PCT No.: PCT/JP96/00330

§ 371 Date: Aug. 18, 1997

§ 102(e) Date: Aug. 18, 1997

[87] PCT Pub. No.: WO96/25050

PCT Pub. Date: Aug. 22, 1996 ---

Signed and Sealed this

Seventeenth Day of April, 2001

Attest:

NICHOLAS P. GODICI

*Attesting Officer*    *Acting Director of the United States Patent and Trademark Office*